No. 859,903. PATENTED JULY 9, 1907.
J. FINER.
WATER LEVEL.
APPLICATION FILED APR. 17, 1905.

Witnesses:
Ella Anderson
Ralph R. Dunway

Inventor;
John Finer
by J. J. Geisler
Atty.

UNITED STATES PATENT OFFICE.

JOHN FINER, OF PORTLAND, OREGON.

WATER-LEVEL.

No. 859,903.      Specification of Letters Patent.      Patented July 9, 1907.

Application filed April 17, 1905. Serial No. 256,015.

*To all whom it may concern:*

Be it known that I, JOHN FINER, a citizen of the United States, and a resident of Portland, county of Multnomah, State of Oregon, have invented a new and useful Water-Level, of which the following is a specification.

My invention has for its object to obtain a water level which is handy to carry about, and to use in the erection of buildings and other construction work.

To this end my invention comprises two semi-transparent graduated tubes, connected by rubber tubing, and provided with suitable valves, so that the level may be kept filled with water ready for use while being carried about. The valves are so constructed as to prevent the escape of the water from the tubes while being carried about, and are adapted to be adjusted in an instant to allow the level to operate.

The features, and the construction and operation of my invention are hereinafter described, and illustrated in the accompanying drawings, hereby referred to as a part of this specification.

Figure 1:
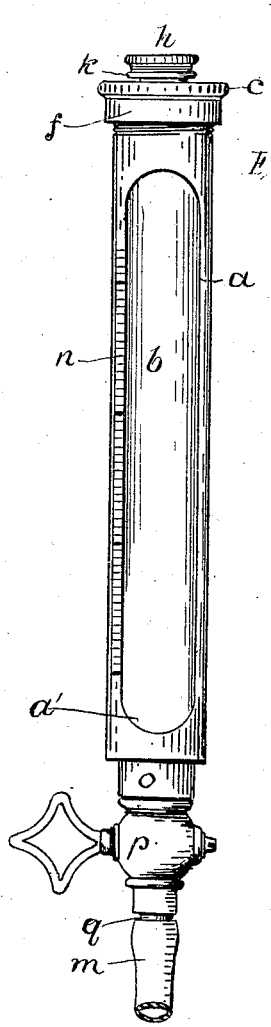
Figure 2:
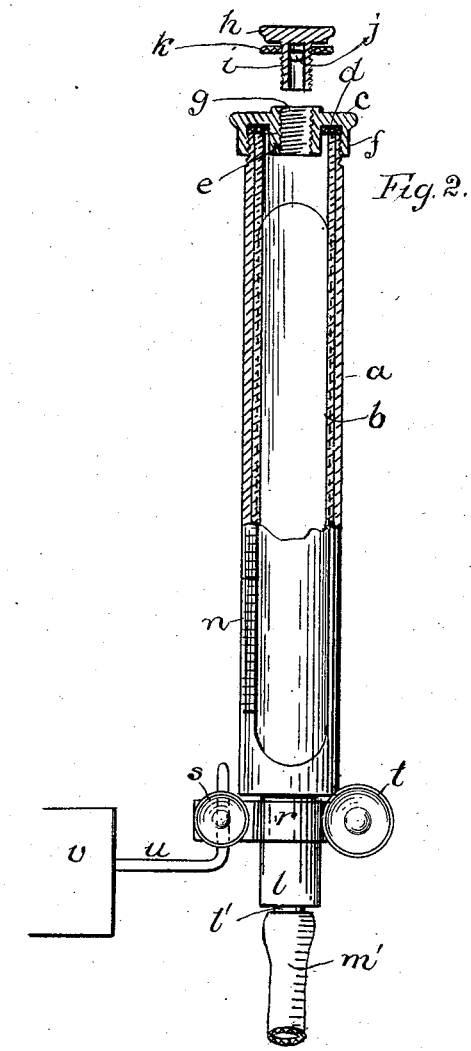
Figure 3:
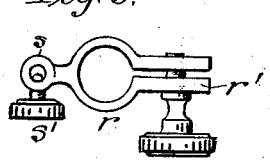

In the drawings, Figure 1, shows an elevation of one of the tubes or water glasses of my level. Fig. 2, is an elevation of the second or corresponding tube or water glass, partly in section so as to more clearly illustrate the construction of the parts. This figure also shows the means provided for supporting this part of my level, while practically using the same, and Fig. 3, is a plan of the clamp $r$.

Referring now to the letters as designating the parts described: The construction of the two tubes or water glasses comprised within my level is substantially the same, except that one water glass is preferably provided with means by which the same may be temporarily secured on some support, at one part of the work, while the other water glass is carried to the other part of the work to be comparatively measured or leveled. Fig. 2, represents the tube which is to be supported as mentioned. For this purpose the neck $l$, being an integral part of the metal casing or shell $a$, is provided with a clamp $r$ shown in Fig. 3; the clamp being made with a thumb screw $t$ to compress the jaws $r$ and with an eye $s$ provided having a set screw $s'$ so that the clamp $r$ may be secured on a pin $u$, having a turned up end, and affixed to some part of the work represented by $v$.

That one of the two water glasses which is to be carried about is represented in Fig. 1, and, as shown, is provided with an auxiliary valve $p$. Both of the water glasses are made with nipples ($l'$, Fig. 2, $q$ Fig. 1,) on which to secure the ends of rubber tube, by which the two water glasses are operatively connected.

In all other respects the construction of two water glasses is identical, and a description of one will suffice. Such construction comprises an outer shell $a$, having cut away portions $a'$, so as to provide sight apertures through which to see the level of the water contained in the glass tube $b$, inserted within the shell $a$. The lower end of the shell $a$, is provided with an aperture extending through the necks, $o$ and $l$, of the respective water glasses, Fig. 1 and Fig. 2.

A suitable gasket is provided in the lower end of the shell $a$, on which to seat the bottom end of the glass tube $b$. The means for making a water tight joint with the lower end of the glass tube $b$ are not shown in the drawings because they are substantially like the means provided for making a water tight joint between the upper ends of the outer shell and the glass tube, illustrated in Fig. 2.

The upper end of the shell $a$ has an exterior thread on which to receive a cap $c$ made with a flange $f$ having an interior thread and a central nipple $e$ having an interior thread in which to insert the threaded stem $i$ of the screw valve $h$. The stem $i$ of the latter is hollow and is made with an aperture $j$.

$d$ is a gasket against which the upper end of the glass tube $b$ rests, so as to obtain a water tight joint between the upper ends of the glass tube and the shell.

The upper face of the cap $c$ is made with a boss $g$, and $k$ is a gasket so that a water tight closure may be obtained when the valve $h$ is screwed down upon the cap $c$.

The shell $a$ is provided with exterior graduations $n$ to enable one to readily and accurately read the position of each water column.

In the practical use of my invention the device is filled with water so that when both water glasses are arranged on a level with each other, the water columns in each will stand about midway.

My level having been filled with water as described, the valve $h$ of each tube is screwed down tight, and by this means the water is of course confined.

The water glass shown in Fig. 2, may then be supported from some part of the work as described, after which the valve $h$ of such tube is slightly screwed up. This will uncover the aperture $j$ through which air will now find ready access through the stem $i$ into the upper part of this water glass. The other water glass Fig. 1, may now be carried to the work to be leveled, in doing which there will be no danger of the water running out of the water glass carried about, because the valve $h$ of this water glass is still closed.

Upon arriving at the work to be leveled or measured, the valve $h$ of the water glass Fig. 1, is screwed up, so as to uncover the aperture $j$, therein provided, upon which the water column is freed to act in accordance with its well known physical principles.

The auxiliary valve $p$ is provided as a convenience, for it may be preferred to open both of the valves $h$ in the two water glasses when about to do measuring work, and then my level may be controlled, that is so operated as to be thrown into and out of action, by the opening and the closing of the auxiliary valve $p$. For while this is shut the water column in the two water glasses is practically confined too, so as to prevent the escape or over flow of water from either water glass, so long as they are not laid in horizontal position, as when not to be used for a time. In the latter case the valves $h$ should first be closed.

Having fully described my invention what I claim and desire to secure by Letters Patent is:

A water level comprising two water glasses each consisting of an outer shell $a$, having a cut-away portion or sight-aperture $a'$ and an apertured neck at the base, which neck is adapted to have the end of a flexible tube affixed thereon; a glass tube within said shell; a cap affixed to the upper end of said shell, and provided with a head $h$, and a central interiorly threaded nipple $e$, the lower end of which extends some distance into the upper end of the glass tube; a valve having a threaded stem inserted in said nipple of the cap and provided with an aperture $j$; means providing a liquid tight contact between the upper face of the cap, and the under side of the valve head, when the valve is screwed down; a valve in the neck of one of the water glasses; means for securing one of said water glasses in upright position to a fixture therefor provided, and a flexible tube connecting the two water glasses; there being graduations on the exterior of said shell.

In testimony whereof, I have hereunto affixed my signature in the presence of two witnesses, this 9th day of August, 1904.

JOHN FINER.

Witnesses:
T. J. GEISLER,
ELLA ANDERSON.